C. J. HOLMES.
RESILIENT METALLIC TIRE.
APPLICATION FILED JUNE 22, 1914.
1,232,547.
Patented July 10, 1917.
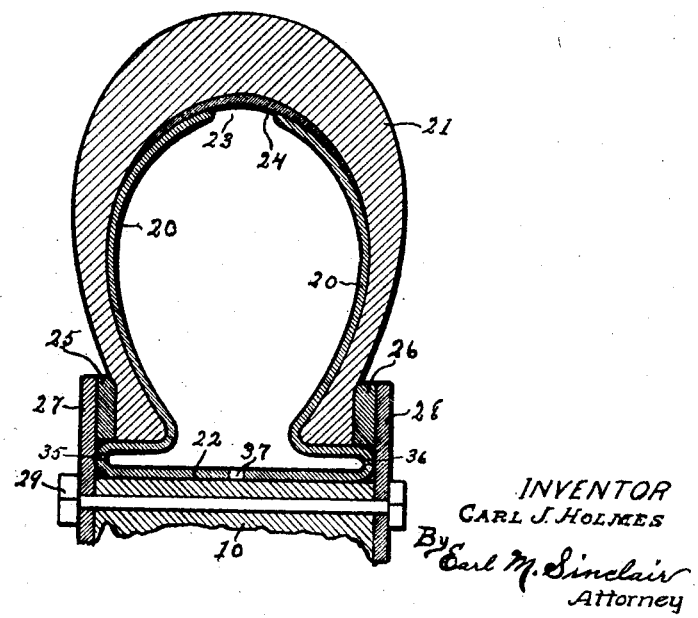
WITNESSES
INVENTOR
CARL J. HOLMES
By Earl M. Sinclair
Attorney

UNITED STATES PATENT OFFICE.

CARL J. HOLMES, OF DES MOINES, IOWA.

RESILIENT METALLIC TIRE.

1,232,547.	Specification of Letters Patent.	Patented July 10, 1917.

Application filed June 22, 1914. Serial No. 846,602.

*To all whom it may concern:*

Be it known that I, CARL J. HOLMES, a citizen of the United States of America, and resident of Des Moines, Polk county, Iowa, have invented a new and useful Resilient Metallic Tire, of which the following is a specification.

The object of this invention is to provide an improved construction for a puncture-proof tire for motor vehicles and the like.

A further object of this invention is to provide an improved resilient steel tire or inner tube for vehicle wheels.

A further object of this invention is to provide an improved resilient steel inner tube for a rubber or a rubber and fabric casing.

My invention consists in the construction, arrangement and combination of elements hereinafter set forth, pointed out in my claims and illustrated by the accompanying drawing, in which—

The view is a cross-section illustrating my improved metallic inner tube mounted in a casing as required for practical use.

In the construction of the device as shown the numeral 10 designates the felly of a supporting wheel of common or any suitable construction. A metallic inner tube 20, formed of sheet steel of certain resilient qualities, by stamping and bending, is fitted to and designed for use with an outer casing 21 of common form. The tube 20 is formed at its inner circumference as a cylindrical rim-engaging portion 22 adapted to rest on the outer periphery of the felly 10 and extend approximately from side to side thereof. At each side the rim-engaging portion 22 is turned to form relatively flat loops, the outer portions of which loops are spaced from and substantially parallel with the inner portions, radially of the wheel, which inner portions are continuations of the rim-engaging portion 22. Beyond the loops the tube 20 conforms generally to the curvature of the interior of the casing 21. The edges of the sheet of which the tube is formed are spaced apart, as at 23, at the outer periphery thereof, and said edges are free to move toward and away from each other as greater or less stress is applied to the tire. The resilience of the metal, with the movement of the edges of the tube 20, sliding within the casing 21, provides the resilience for the tire, when taken with such natural resilience as may reside in the casing 21. If desired a concavo-convex protecting plate 24 may be introduced within the casing 21 and lie between such casing and the sliding free margins or edges of the tube 20. It is the function of the plate 24 to protect the casing 21 from the wear of the margins of the tube 20, and to prevent pinching of the casing by said edges in their sliding movement.

The casing and tube may be held in place by any desired and suitable means, such as rings 25, 26 mounted on opposite sides and held in place by annular plates 27, 28, which in turn are held in place by bolts 29 passing through the felly.

I have also shown the tube 20 formed with longitudinal slots 35, 36 in one end, in the loops at the sides adjacent the rim-engaging portion 22. In this construction the rim-engaging portion of the opposite end of the tube is introduced within the slots 35, 36, the remainder of such opposite end being caused to embrace the remainder of the slotted end. The resilience of the material may be depended upon to permit springing of the non-slotted end over the slotted end, or such non-slotted end may be slightly enlarged in diameter if deemed necessary. The slotted end of the rim-engaging portion 22 may be formed with a plurality of holes 37, one of which is shown, for engagement by a stud (not shown) or any desired means on the non-slotted end. Thus the ends of the tube are adjustably and securely held together, the resilience of the metal causing them to remain in any position in which they may be placed.

I do not desire to be understood as limiting myself to the precise construction herein shown and described, either as to the tube construction, the means for securing the tube together at its ends, of the means for securing the tube to the felly, as various modifications and arrangements thereof may be employed without departing from the spirit of my invention.

I claim as my invention—

1. A metallic tube for automobile casings, comprising a strip of resilient steel bent to form a cylindrical rim-engaging portion at its inner periphery, said tube being looped inwardly at opposite sides of said rim-engaging portion and spaced therefrom, thence curved outwardly to conform to the cross-section of the casing, and having its edges spaced apart at the outer periphery of the tube, whereby a split tube is formed.

2. A metallic tube for automobile casings, comprising a strip of resilient steel bent along opposite sides of its median line to form a rim-engaging portion, bent inwardly on both sides to form relatively flat loops, and curved outwardly on both sides to correspond approximately with the interior of the casing, and having its edges spaced apart at the outer periphery of the tube, whereby a circumferentially split tube is formed.

3. The combination of a tire casing and a split, resilient inner tube formed of a strip of sheet metal having its medial portion bent to form a rim-engaging portion, said tube being looped inwardly at opposite sides and approximately parallel with and spaced from said rim-engaging portion, thence curved outwardly to conform to the curvature of the casing approximately, the margins of said strip being spaced apart within and slidable transversely within the outer periphery of said casing, and a protecting plate mounted between said sliding edges and the casing.

Signed by me at Des Moines, Iowa, this 15th day of June, 1914.

CARL J. HOLMES.

Witnesses:
EARL M. SINCLAIR,
W. S. HOUGHTON.